US009836631B1

(12) United States Patent
Hanina et al.

(10) Patent No.: US 9,836,631 B1
(45) Date of Patent: Dec. 5, 2017

(54) METHOD AND APPARATUS FOR FRACTAL IDENTIFICATION

(71) Applicant: AIC Innovations Group, Inc., New York, NY (US)

(72) Inventors: Adam Hanina, New York, NY (US); Lei Guan, Jersey City, NJ (US)

(73) Assignee: AIC Innovations Group, Inc., New York, NY (US)

( * ) Notice: Subject to any disclaimer, the term of this patent is extended or adjusted under 35 U.S.C. 154(b) by 0 days.

(21) Appl. No.: 15/137,984

(22) Filed: Apr. 25, 2016

Related U.S. Application Data

(60) Provisional application No. 62/152,961, filed on Apr. 26, 2015.

(51) Int. Cl.
*G06K 7/10* (2006.01)
*G06K 7/14* (2006.01)

(52) U.S. Cl.
CPC ....... *G06K 7/10722* (2013.01); *G06K 7/1413* (2013.01)

(58) Field of Classification Search
USPC ......... 235/375, 383, 462.01–462.09, 462.41, 235/494
See application file for complete search history.

(56) References Cited

U.S. PATENT DOCUMENTS

| 5,065,447 | A | * | 11/1991 | Barnsley | ................ | G06T 9/001 |
| | | | | | | 358/426.04 |
| 5,867,603 | A | * | 2/1999 | Barnsley | ................ | G06T 9/001 |
| | | | | | | 375/E7.204 |
| 7,266,693 | B1 | * | 9/2007 | Potter | ................ | H04L 9/3226 |
| | | | | | | 382/249 |
| 7,946,477 | B1 | * | 5/2011 | Ramachandran | .... | G06K 7/0004 |
| | | | | | | 235/379 |
| 8,720,790 | B2 | | 5/2014 | Hanina | | |
| 9,443,233 | B1 | * | 9/2016 | Brunetto | .............. | G06Q 20/108 |
| 2002/0054694 | A1 | * | 5/2002 | Vachtsevanos | ...... | G01N 21/956 |
| | | | | | | 382/111 |

(Continued)

OTHER PUBLICATIONS

Allain and Cloitre, *Characterizing the lacunarity of random and deterministic fractal sets*, Phys Rev A. 44(6):3552-3558 (Sep. 1991).

(Continued)

*Primary Examiner* — Tuyen K Vo
(74) *Attorney, Agent, or Firm* — Fish & Richardson P.C.

(57) ABSTRACT

In general, in some aspects, the subject matter of the present disclosure can be embodied in methods for confirming identity, in which the methods include: outputting a parameter by a reading device, the reading device adapted to read an image displayed on a display of a display device; receiving the parameter output by the reading device by the display device; generating a fractal image at least in accordance with the received parameter by the display device; displaying the generated fractal image on the display of the display device; imaging the displayed fractal image by the reading device; comparing the imaged fractal image to an expected fractal image generated by the reader at least in accordance with the parameter; and confirming that the imaged fractal image and the expected fractal image do not differ by more than a predetermined amount.

19 Claims, 1 Drawing Sheet

(56) References Cited

U.S. PATENT DOCUMENTS

| | | | | |
|---|---|---|---|---|
| 2007/0184373 | A1* | 8/2007 | Mertens | G01J 3/46 |
| | | | | 430/65 |
| 2009/0202147 | A1* | 8/2009 | Sambongi | G06F 17/3025 |
| | | | | 382/165 |
| 2014/0046842 | A1* | 2/2014 | Irudayam | G07F 19/202 |
| | | | | 705/43 |
| 2015/0380355 | A1* | 12/2015 | Rogers | H01L 23/538 |
| | | | | 257/773 |
| 2016/0210621 | A1* | 7/2016 | Khan | G06Q 20/3821 |

OTHER PUBLICATIONS

Ross and Jain, *Information fusion in biometrics*, Pattern Recognition Letters 24(13):2115-2125 (Sep. 2003).
Theiler, *Estimating fractal dimension*, J. Opt. Soc. Am. A 7, 6, pp. 1055-1073 (1990).
Xu, et al., *A projective invariant for textures*, Computer Vision and Pattern Recognition 2, pp. 1932-1939 (2006).
U.S. Appl. No. 61/544,056, filed Oct. 6, 2011, Hanina.
U.S. Appl. No. 61/623,148, filed Apr. 12, 2012, Hanina et al.
U.S. Appl. No. 61/623,193, filed Apr. 12, 2012, Hanina et al.
U.S. Appl. No. 61/683,849, filed Aug. 16, 2012, Hanina et al.
U.S. Appl. No. 13/646,634, filed Oct. 5, 2012, Hanina.
U.S. Appl. No. 13/388,602, filed Dec. 28, 2011, Hanina.

* cited by examiner

METHOD AND APPARATUS FOR FRACTAL IDENTIFICATION

CROSS REFERENCE TO RELATED APPLICATIONS

This application claims the benefit of U.S. Provisional Patent Application Ser. No. 62/152,961, filed Apr. 26, 2015 to Hanina et al, titled "Method and Apparatus for Fractal Identification", the entire contents thereof being incorporated herein by reference.

INCORPORATION BY REFERENCE

This application incorporates by reference the entire contents of U.S. Provisional Patent Application Ser. No. 61/544,056, titled Method and Apparatus for Fractal Identification, filed Oct. 6, 2011 to Hanina; expired, U.S. Provisional Patent Application Ser. No. 61/623,148, titled Method and Apparatus for Fractal-ID™-Fractal Identification and Verification System, filed Apr. 12, 2012 to Hanina et al.; expired, U.S. Provisional Patent Application Ser. No. 61/623,193, titled Method and Apparatus for Fractal-ID™-L-System Fractal Curve Identification, filed Apr. 12, 2012 to Hanina et al.; expired, and U.S. Provisional Patent Application Ser. No. 61/683,849, titled Method and Apparatus for Identification, filed Aug. 16, 2012 to Hanina et al., expired. This application also incorporates by reference the entire contents by reference of U.S. patent application Ser. No. 13/646,634, titled Method and Apparatus for Fractal Identification of an Object, filed Oct. 5, 2012, pending, and U.S. patent application Ser. No. 13/388,602, titled Method and Apparatus for Fractal Identification filed Dec. 28, 2011 to Hanina, now U.S. Pat. No. 8,720,790.

TECHNICAL FIELD

This application relates generally to the identification of using a fractal image as an identifier that can robustly confirm the identity of a person, object, or the like.

BACKGROUND

Identification

The inventors of the present invention have recognized that identification of a person or electronic apparatus is an extremely large problem. Simple bar and QR codes may be employed, but these are able to be easily copied and distributed, providing no real security of the identification of a user. The use of permanently fixed tags or the like has also been recognized by the inventors of the present invention as being a problem, as in once compromised, there is no method for adjusting the identification information. Furthermore, there is no method for increasing the complexity of the image, or adding additional information at different resolutions of such a code.

Existing Identification Technologies

There are several technologies that have been employed for identification, electronic or otherwise. An example is radio frequency identification which uses electronic devices to track and identify items, by assigning individual serial numbers to the containers holding each product. Other more traditional systems may be applied to such object identification, such as barcoding being provided on packaging or on the actual device (either one or two dimensional). For such a use, however, any damage to the barcode, difficulty in printing the barcode (such as deformation based upon printing surface), or obscuring a portion of the barcode may render the barcode inoperative. Additionally, once imprinted on the device, there is no method or ability to update or change the identifying marker.

While one or two dimensional barcodes have been used as serial identifying elements, as recognized by the inventors of the present invention, their designs are relatively easy to replicate, require fixed surface areas and specific alignment for printing, and are rendered unusable if occlusion occurs due to handling or if the barcode is damaged. During such a use, as noted, any damage to the barcode, difficulty in printing the barcode (such as deformation based upon printing surface), or obscuring a portion of the barcode may render the barcode inoperative. Additionally, barcodes may be easily copied and applied to counterfeit objects. None of these systems are sufficient for imparting robust identification information to an object. While holographic printing on hang tags and the like has been employed in an effort to mark various objects, and to perhaps stop counterfeiting of these objects, these tags may be removed and possibly copied as printing on a single tag may not be seen as a particularly difficult deterrent. Thus, not only is secure identification impossible, varying levels of desired security cannot be employed.

Therefore, it would be desirable to provide a method and apparatus that overcome the drawbacks of the prior art.

SUMMARY

In accordance with one or more embodiments of the present invention, a standardized process for providing an electronic identifying image on a display, such as that in a computer, mobile device, or the like is provided. Preferably, the identifying image comprises one or more fractal images, as will be described below. These fractal images are mathematically generated, and therefore provision of a particular mathematical equation will result in a predictable displayed image. In such a manner, an image may be provided to a user, for example, to display on their mobile device display. This displayed image may be read by a camera or other preconfigured reader. The reader may be aware of the expected image, and may be able to determine whether a read image is similar to the expected image. Processing time may also be employed to confirm proper processing time for a device and display to present a particular image.

Furthermore, it is possible that one or more variables, coefficients or other values are first provided by the reader to the mobile device (acquired by visual image recognition, bluetooth, wi-fi, or any other communication protocol). Upon receipt, that received variable, coefficient or other value may be employed in accordance with a predefined fractal image equation, thus resulting in a uniquely displayed image on the mobile device. The reader may then be aware of the expected image, once employing the provided variable, coefficient or other value, and may confirm if a proper image is displayed.

Additionally, as a fractal image is displayed on the display of the mobile device or other device, (or projected onto a surface or the like) as one characteristic of fractal images is the repetition of structure at an infinite number of layers, or dimensions. Thus, as the fractal to be displayed may be mathematically generated, a fractal with any number of predetermined number of layers may be displayed, up to any limitations imposed by the display technology. Thus, a display device may be requested to be displayed with a particular number of layers, and the reader may be configured to expect to read these predetermined number of layers.

If the image is simply copied and redisplayed in an unauthorized manner, a newly-requested number of layers to be displayed may not be correct.

Furthermore, a user may be asked to move the display closer to or further from the reader. Such movement may allow for the display to be requested to display a greater or fewer number of layers of the fractal image. Thus, in an automated fashion, as the device is moved closer to the reader, a greater number of layers may be requested and displayed, thus aiding in confirming identification.

Once displayed on a display of a device or other display, computer vision may be applied to read these generated fractal images to automatically confirm identification and authenticity of the object, or user displaying the image on their display. Thus, different levels of fractal dimensions (the number of times the fractal pattern is recursively printed within itself) may be displayed, and can therefore be read from the display employing different resolution imaging devices, providing varying levels of security and precision in the identification process. By providing these requests in a non-uniform fashion, it would be difficult for an individual to guess the order of the requested presentation of the images, including the requested resolution and/or requested completed equation.

Fractal Encoding

Fractal geometry is a branch of mathematics that deals with geometric objects that are too detailed to be described by standard Euclidean geometry [4]. K. Falconer, *Fractal Geometry* (Wiley, West Sussex, England, 2003). While there is no precise definition of what constitutes a fractal, there are some properties that most fractals share:

self-similarity: parts of each fractal are similar to the whole in some sense (i.e., geometrical, approximate, statistical).

fine structure: zooming in on a portion of the fractal reveals detail no matter how small the scale may be.

fractal dimension: the "fractal dimension" of the fractal is greater than its topological dimension (i.e., 1 for a line, 2 for a square, 3 for a cube).

simple definition: though the fractal itself may be quite complex, its mathematical description is very simple.

A fractal is a rough or fragmented geometric shape that can be split into parts, each of which is (at least approximately) a reduced-size copy of the whole, a property called self-similarity. A fractal often has the following features:

It has a fine structure at arbitrarily small scales.

It is too irregular to be easily described in traditional Euclidean geometric language.

It is self-similar (at least approximately or stochastically).

It has a Hausdorff dimension which is greater than its topological dimension (although this requirement is not met by space-filling curves such as the Hilbert curve).

It has a simple and recursive definition.

Because they appear similar at all levels of magnification (at each dimension), fractals are often considered to be theoretically infinitely complex (in informal terms).

By encoding one or more pieces of identification information into such a fractal through the use of one or more predetermined fractal type, color, or other fractal parameter, and displaying or the resulting fractal on a display, a robust and secure identification scheme may be provided. Varying resolutions and complexities of such fractals may be employed in order to impart desired levels of security. More complicated fractals having a greater number of dimensions (and thus allowing an imaging device with higher levels of resolution to recognize the fractal pattern more completely at these greater levels of resolution may be employed for use with objects needing higher levels of security, as these more complex fractals are more difficult (or impossible) to copy, requiring at least higher quality displays and readers that may not be easily available. As further recognized by the inventors of the present invention, a low-cost tool such as a webcam combined with computer vision software may be provided to properly image and identify such a fractal image displayed on a display of a mobile device or other appropriate display, and may be edited or changed based upon a parameter, variable or other input, in the manner as noted above.

Once generated and displayed, the fractal image provides a robust identification system that is resilient against partial occlusion. Additionally, multiple fractal patterns may be overlaid, thus producing a more complex identification image.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts that are adapted to affect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

The detailed embodiments of the invention will now be described making reference to the following drawings in which like reference numbers denote like structure or steps.

In accordance with an embodiment of the invention, a display, such as the display of a mobile device, computing device and the like may be employed for displaying one or more predetermined fractal images. Furthermore, single or multiple color displays may be employed. A reader device may comprise a mobile device with a camera, a more sophisticated computer system with a dedicated camera, or a purpose-build identification system for reading images such as those described in accordance with this application.

Fractal Display

Figure 1:
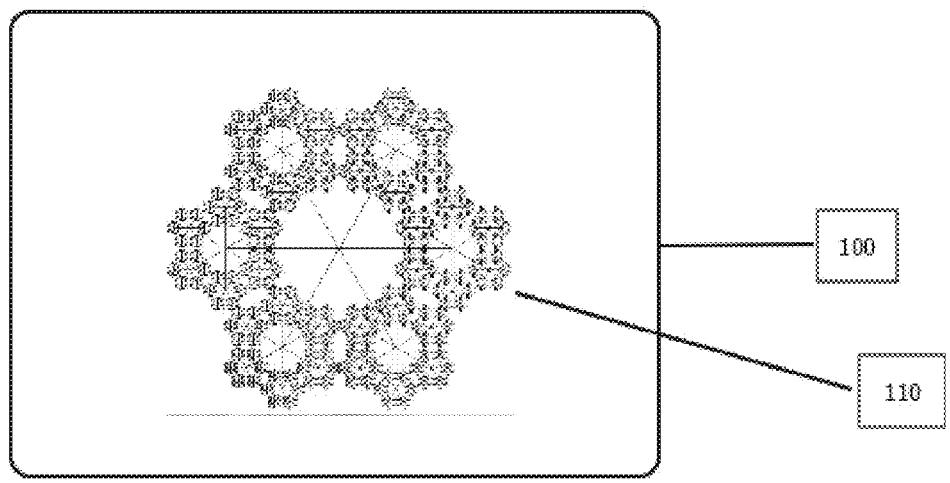
FIG. 1 depicts an exemplary display an exemplary fractal image displayed thereon in accordance with an embodiment of the invention.

Referring first to FIG. 1 depicting a first embodiment of the invention, a fractal image 110 is shown displayed on a display of a mobile device 100. As is shown, the fractal image covers a substantial portion of the display. Fractal image 110 may cover substantially less than all of the surface of display 100. Because of the self-similarity nature of fractal images, as can be seen, each portion of fractal image 110 looks substantially similar to the whole of fractal 110, and is theoretically identical. This self similarity continues, theoretically, to an infinitely small portion of the fractal image. Of course in practice, the levels (or dimensions) of self similarity available are limited by display resolution, and the ability to "see" these multiple dimensions may be dependent upon an imaging resolution of an imaging device. The present invention exploits these features of reality in order to provide a varied solution applicable in different security situations.

Display 100 is preferably provided in conjunction with computing mobile device, including a processor for processing data, memory for storing data and programs to operate the mobile computing device. The mobile device may further comprise a communication system for transmitting and receiving data to and from the mobile device. In one or more embodiments of the invention, data may be received from a remote location in order to process local data, or to display one or more fractal images or other data on the display of the local mobile device. Furthermore, computing mobile device (or other local computing device) may include one or more communication protocol elements so that the device may communication via bluetooth, wi-fi, or other communication protocol to receive one or more data elements that may be used to indicate a form of a fractal or other image to be displayed on the display.

Figure 2:
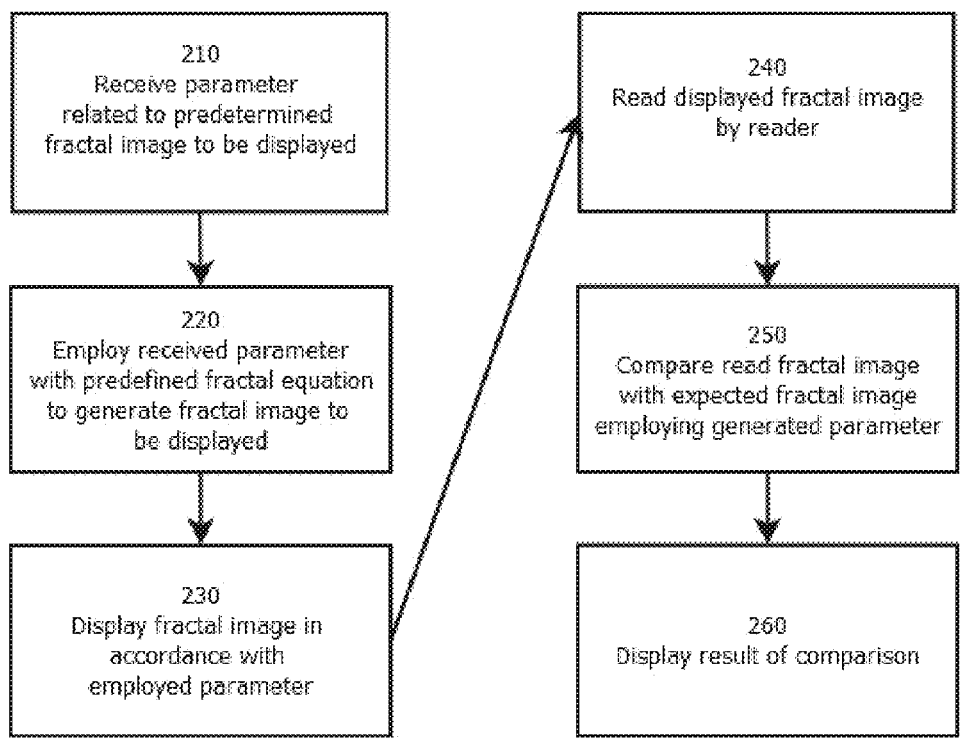
FIG. 2 is a flowchart diagram depicting a method for confirming an identification through a fractal image in accordance with an embodiment of the invention.

Additionally, as a fractal image is displayed on the display of the mobile device or other device, as one characteristic of fractal images is the repetition of structure at an infinite number of layers, or dimensions. Thus, as the fractal to be displayed may be mathematically generated, a fractal with any number of predetermined number of layers may be displayed, up to any limitations imposed by the display technology. Different fractal images may be employed based upon a desired display method (display vs. projection). For example, a modified cantor pattern may be employed (including a code embedded in a modified fractal pattern, such as the use of missing or otherwise modified pixels in an image) to provide additional robustness when presenting such an image to be read at a reading sensor. More complex fractals with significant self-similarity at varying resolutions, and also presenting a more complex image that is harder to replicate. Such high-resolution images may be loaded onto such a mobile device, and the system may indicate which such images should be displayed on the display. Thus, the display device may be requested to be displayed with a particular number of layers, and the reader may be configured to expect to read these predetermined number of layers. If the image is simply copied and redisplayed in an unauthorized manner, a newly-requested number of layers to be displayed may not be correct. Such a process is shown in accordance with FIG. 2. Thus, as is shown, at step 210, a reader is first requested to provide a particular parameter to a display device to display a fractal image employing at least that parameter. This parameter may similarly be provided to both the reader and the display device from any other third location, or any other source, or may be provided from the display device to the reader. It is preferred that the fractal image be predefined, but in an alternative embodiment of the invention, one or more of the parameters may be employed to identify the fractal equation to be used, in addition to one or more parameters to be use within the fractal equation. Then, at step 220, the mobile or other computing device employs the one or more parameters to mathematically generate and display a corresponding fractal image. At step 230, that fractal image is displayed on the display.

Further at step 240, the reader then images the displayed fractal image, and at step 250 a processor associated with the reader, employing the provided parameter to an agreed upon fractal equation, compares the acquired fractal image to the expected fractal image (using, for example, one or more of the techniques described below, or one or more other techniques for image comparison, to determine a similarity between the acquired and expected image (i.e. whether the two fractal images do not differ by more than a predetermined amount). Finally, at step 260, a result of the comparison is displayed.

In an alternative embodiment, at step 210, one or more of the parameters provided from the reader to the display apparatus to be an indication of a number of fractal layers to be generated and displayed on the display. Such an indication may take into consideration an available level of resolution of the display device. Thus, with this parameter being employed, a reader may look to read the indicated levels of the fractal image from the display, to thus further improve the security of reading of the image.

Additionally, in a still further alternative embodiment of the invention, a string of parameters may be employed in order to provide a continuously (or stepwise) changing fractal image to be displayed, the reader looking for the displayed sequence of images to confirm proper identification. In an additional embodiment of the invention, a proximity detector may be provided on either the reader or display device. As the two are moved closer together, the display can be requested to display additional levels of the fractal image, and the reader can expect to read those additional levels.

Furthermore, if the fractal image is to be displayed on the screen of smartphone, mobile device, or other monitor, limitation of the resolution of the display may be preferably overcome by dynamically updating the display of the fractal images into different levels. For instance, one may first confirm a first N layers on the display. Once confirmed, the display may be configured to automatically zoom into N+1 layer and etc., thereby allowing for different levels of fractal images to be confirmed even with a limited ability to display all of the desired fractal levels.

Also, for application of the system on a smartphone, other mobile device, or PC, the inventors of the present invention have determined that it is possible to use multiple fractals to improve security and avoid fraud. The system may preferably first display a first fractal for identification. Upon received results of identification and confidence level, the system may be preferably configure to dynamically show another second fractal for identification and etc. Any number of such fractals in sequence may be employed, and may be coupled with the use of one or more passwords, etc. as desired.

Fractal Resolution

In accordance with one or more embodiments of the present invention, the use of high resolution display devices or projectors may be employed when more robust security measures are required, increasing the complexity of such a displayed image, and leading to greater security in identification of each item. Such increased resolution may also allow for more precise measurements of the details of the fractal image, such as one or more distances between various portions thereof, ratios of one or more various measured lengths or angles of various portions thereof, etc., which may then be compared to expected values to confirm authenticity and identification.

Fractal Complexity

Furthermore, various types of fractals may be employed based upon a desired level of security. Thus, more complex versions of fractal images may be employed where a more secure identification system is desired. Variations in such fractal images may include changes in angles, length, number of pixels employed, distribution of one or more characteristics or pixel density, purposeful omission of particular pixels, use of particular color combinations on a planned or randomized basis. Not only may generally more complex images be used, but a higher resolution display may also be employed, thus allowing for more precise display of multiple fractal dimensions, and eventual recall and analysis of the fractal images by higher resolution imaging devices at deeper acquisition resolution. Furthermore, as noted above, combination fractals may be employed to provide additional robustness against counterfeiting, and for determining identity. These combined fractals may be particularly chosen to allow for determination of different types of information. Additionally, various color gradient application may allow for the calibration of the fractal image.

Therefore, in accordance with an embodiment of the invention, a desired level of security may first be defined, and a corresponding necessary display resolution may be determined. Thereafter, a predefined fractal image may be displayed on the display to be imaged by an imaging device. After such a display, in order to properly identify the fractal image, imaging steps may be employed. Thus, a desired level of identification security may be first defined, and thereafter a corresponding imaging apparatus may be selected. Thus, if simple visual identification by an end user or patient is desired, a webcam associated with a mobile device or the like may be employed to image a high level and one or more additional dimensions of the fractal image, even if substantially more fractal dimensions have been displayed. If, however, a more robust identification is desired, an imaging device able to image to a much higher resolution, thus allowing for the confirmation of existence of any desired number of fractal dimensions, may be employed. The selected imaging apparatus may be used to acquire an image of the displayed fractal image, and the identity of the fractal image may be confirmed to the desired level of security.

A user may further present a displayed fractal image to a webcam or other more sophisticated imaging device, which may provide local identification and confirmation of the identity of the fractal image, or may forward such information to a remote location for further processing. If local processing is not to be employed, then an acquired fractal image or video sequence of images may be transmitted to a remote location for processing. After such remote processing is performed, the results of such processing may be returned to the imaging device. After such analysis, whether performed locally or remotely, the user is notified of the identity of the fractal image. The remote server or local device may analyze the imaged fractal image, identify the fractal image, and may indicate a determination of authentication or counterfeit of the fractal image. If counterfeit (as determined locally or remotely), the user may be notified of such.

Fractal Coding

In accordance with one or more embodiments of the invention, information may be coded into the fractal, by placing such coding information into one or more parameters that may be stored in a parameter file used to generate the fractal. Thus, a batch number or the like may be used in the place of particular parameters used to define the fractal image. Alternatively, a reader may provide such a parameter to the display apparatus or associated computing device via any of the noted or other communication protocols. Thus, such a parameter may be incorporated into the fractal mathematical equation employed to generate the fractal image. Thus, the reading device, if knowledgeable of the general fractal equation to be employed, and is also knowledgeable of the parameter, the reader is able to predict one or more characteristics of such a displayed fractal image. In such a manner, a "fractal handshake" may be employed to allow for the display and recognition of a fractal image. Furthermore, the transmitted information may also indicate a number of fractal layers to be displayed on the display, thus providing yet another variation in the image to be displayed, and therefore providing another opportunity for identification of the displayed image.

Recognition of the fractal, and reverse engineering thereof to recreate the parameter file may then provide access to the batch number or the like by the user, for example. It is anticipated that only a predetermined number of parameters may be employed for particular coding, others of the parameters being adopted to vary in a pseudo-random or other predetermined manner in order to make it more difficult to predict future likely parameter combinations. Alternatively, randomly generated fractals may be employed and recognized from a look-up table to be associated with a particular batch processing unit. Other methods may provide a library of fractal images.

In accordance with an embodiment of the invention, one may embed codes into the fractal image that are distributed that can be properly resolved and interpreted up in reasonable lighting conditions by a low resolution camera. If higher resolution is available in the displayed fractal images, but cannot be precisely determined by the low resolution camera, that low resolution camera may further be employed to determine likely distributions of color or shape across such a fractal that, while perhaps not being precisely distinctive, do provide an additional level of security above the simply lower resolution components of the fractal image. Since these patterns are replicated, the system may decision fuse multiple instances of the same uncertain distribution to come up with a much higher probability of confirmation.

Robust Imaging Solution

Upon reading of a displayed fractal identification image through the user of a standard barcode laser scanning device, image acquisition, or other method for reading information from the display, various reference points may be used to aid in determining authenticity. Upon the determination of one or more of such reference points preferably defined by one or more of a pattern, color, combination thereof or the like in a fractal image, distances and ratios to other reference points may be determined and used to confirm authenticity, or a level of confidence in that authenticity, in a manner as described above. Thus, a display may be scanned, and existence of at least a portion of such a fractal may be determined. If there is enough information in the portion of the fractal image to confirm identity, then identity is confirmed. If however, not enough information is available, various pieces of fractal images may be pieced together to determine enough information. Alternatively, an occlusion or the like may be effectively disregarded through such piecing together of the fractal image. Such information to be pieced together may be taken from one or multiple fractal dimensions. Further, a user may be instructed to bring such a display closer to an imaging apparatus (or otherwise zoom in on the object), in order to improve capture resolution. As the user is asked to move the display towards or away from an imaging apparatus, the number of fractal levels may be increased or decreased based upon the available resolution of the display and the imaging device.

Image Analysis

For images of objects with a fractal pattern displayed on them, computer vision techniques may be used to analyze the image. Image analysis may incorporate such techniques as global and local feature detection and description, histogram analysis, image thresholding, image segmentation, etc. Global features may include shape, contours, image moments, object/pattern orientation, etc. Local features may include corners, blobs, line segments, gradients, keypoints, anchor points, etc. The information extracted at this stage may then be used for comparison between test images and stored images. The information may be compared in various ways, including the use of feature vectors.

Fractal Features

One way fractals are distinguished from regular geometric patterns is by their non-integer dimension. For example, the Sierpinski triangle, a well-known fractal, has dimension≈1.585. The main definition of fractal dimension is known as Hausdorff dimension, which requires computing an infinum over all possible coverings of a fractal by small sets. Since this covering cannot typically be computed in practice, fractal dimension is usually estimated J. Theiler, "Estimating fractal dimension," *J. Opt. Soc. Am. A* 7, 6 (1990), pp. 1055-1073. Commonly used estimators of dimension are the box-counting dimension and the correlation dimension. Both of these are instances of generalized dimension:

$$D_q = \frac{1}{1-q} \lim_{r \to 0} \frac{\log \sum_i P_i^q}{\log r},$$

where r is the side-length of the boxes of a grid covering the attractor and $P_i = \mu(\mathcal{B}_i)/\mu(\mathcal{A})$ is the normalized measure of the ith box $\mathcal{B}_i$. $P_i$ is usually estimated by counting the number of points of the attractor in the ith box and dividing by the total number of points. Setting q=0 corresponds to the box-counting dimension while setting q=2 corresponds to the correlation dimension. In accordance with such computation, the attractor is successively covered with grids of boxes of decreasing size. For each such grid, the number of boxes that contain a part of the attractor is counted, and the (box-size~number of boxes) pairs are plotted on a log-log plot. The slope of the regression line in this particular instance is calculated as 1.58496.

Therefore, in accordance with one or more embodiments of the present invention, fractal dimension estimation of an image to be tested may be implemented in the following manner:

1) Extract fractal from a given test image: The test image may be provided from any standard camera, such as on cellphones or tablet pc's. Any preprocessing of the image (thresholding, rotation, perspective transformations, Gaussian filters, Laplace filters, etc.) may be implemented here. The image may be applied to any desirable surface, in accordance with the invention, and may in particular be applied to a medication pill or other object for which authentication or identification is desired.

2) Apply the box-counting algorithm: The sizes r will typically range from L/2 to 1, where L is the side length of the image.

3) Compare the results of the algorithm to results from stored images: The results calculated in step 2 are preferably compared to results in a list of possible IFS fractals, and the IFS code with the closest fractal dimension is selected. Such a list of possible fractals are preferably printed, and this same calculation is performed for each, thus generating a table of dimension values for different fractal images that may be applied to an object or otherwise printed in accordance with one or more embodiments of the invention. A stored dimension value that is closest to the measured and determined fractal value is preferably indicated as the matching fractal. Additionally, in accordance with one or more embodiments of the present invention, a user-defined threshold may preferably be implemented so that if the difference between the computed dimension and expected dimension exceeds the threshold, then no IFS code may be selected from the database and a null value is preferably returned. The addition of this threshold makes sure that only close images may be considered, and provides a level of confidence that there is an actual match between the computed dimension of the images fractal image, and the expected dimension of one of the stored fractal images.

In accordance with an additional embodiment of the invention, an inventive lacunarity analysis may be implemented to determine fractal dimension when the image being analyzed is a fractal. Lacunarity may be estimated by a gliding-box algorithm. C. Allain \& M. Cloitre, "Characterizing the lacunarity of random and deterministic fractal sets," *Physical Review* A 44, 6 (1991), pp. 3552-3558. Such a gliding box algorithm provides that for each pixel p in an image, a box of radius r is preferably centered at p, and the number of pixels s in the box which are part of the fractal pattern is counted. This creates a frequency distribution n(s,r) which is the number of boxes of size r with s pixels. After computing n(s,r) for each p and for several box sizes r, the frequency distributions may be converted into probability distributions Q(s,r) by dividing by the total number of boxes N(r) of size r. The first and second moments may then be computed as $$Z^1(r) = \sum_s s Q(s, r)$$

$$Z^2(r) = \sum_s s^2 Q(s, r),$$

and lacunarity at scale r is then preferably defined as $$\Lambda(r) = \frac{Z^2(r)}{[Z^1(r)]^2}.$$

For fractal patterns, in accordance with this embodiment of the invention, plotting log r vs. log Λ(r) yields a curve which is a straight line with slope m=D−E, where D is the fractal dimension and E is the Euclidean dimension.

Therefore in accordance with one or more embodiments of the present invention, lacunarity estimation of a test image may be implemented in the following manner:

1) Extract fractal from a given test image: The test image can be provided from any standard camera, such as on cellphones or tablet pc's. Any preprocessing of the image (thresholding, rotation, perspective transformations, etc.) will be implemented here. The image may be applied to any desirable surface, in accordance with the invention, and may in particular be applied to a medication pill or other object for which authentication or identification is desired.

2) Apply the gliding-box algorithm: The scales r will typically range from 1 to L/2, where L is the side length of the image.

3) Compare the results of the algorithm to results from stored images: The results calculated in step 2 are compared to the results in a list of possible IFS fractals, and the IFS code with the closest lacunarity is selected. Such a list of possible fractals are preferably printed, and this same calculation is performed for each, thus generating a table of lacunarity values for different fractal images that may be applied to an object or otherwise printed in accordance with one or more embodiments of the invention. A stored lacunarity value that is closest to the measured and determined lacunarity value is preferably indicated as the matching fractal. Additionally, in accordance with one or more embodiments of the present invention, a user-defined threshold may preferably be implemented so that if the difference between the computed lacunarity and expected lacunarity exceeds the threshold, then no IFS code may be selected from the database and a null value is preferably returned. The addition of this threshold makes sure that only close images may be considered, and provides a level of confidence that there is an actual match between the computed lacunarity of the images fractal image, and the expected lacunarity of one of the stored fractal images.

As lacunarity may be alignment dependent, depending on the fractal image employed, a method for aligning such a fractal image may be employed. Thus, in accordance with one or more embodiments of the present invention, alignment points may be provided to allow for such alignment. These alignment points may be provided as part of the fractal image (comprising a modification thereof), or may be printed on top of the fractal image to indicate alignment. As alignment is preferred, this lacunarity step may be used alone or in conjunction with the dimension calculation described above to determine a matching fractal.

Multi-Fractal Spectrum

To create a feature vector of fractal dimensions, the method described in the previous section regarding the computation of generalized fractal dimension may be implemented for a user-defined range of values of q, including non-integer values. A Legendre transform may then be applied to these values $\beta(q)$, $$f(\alpha(q)) = q\alpha(q) - \beta(q),$$

where $$\alpha(q) = \frac{d\beta(q)}{dq}.$$

The resulting $(\alpha(q), f(\alpha(q)))$ pairs then form a multi-fractal spectrum for a user-defined range of $\alpha$'s that may then be used to analyze and compare images of fractals. K. Falconer, *Fractal Geometry* (Wiley, West Sussex, England, 2003); Y. Xu, H. Ji, \& C. Fermuller, "A projective invariant for textures," *Computer Vision and Pattern Recognition* 2 (2006), pp. 1932-1939. [4, 9].

Evaluation of a Test Image

Evaluating a test image against a stored image using both image analysis and fractal features requires combining information in a manner that allows for robust comparison. This process is known as information fusion (A. Ross \& A. Jain, "Information fusion in biometrics," *Pattern Recognition Letters* 24 (2003), pp. 2115-2125), and may be implemented at three levels in accordance with one or more embodiments of the invention:

1) at the feature extraction level,
2) at the matching score level,
3) at the decision level.

At the feature extraction level, feature vectors generated from image analysis and fractal features are preferably combined to form a single feature vector to be used in comparison. At the matching score level, image analysis feature vectors from test images may be compared to image analysis feature vectors of stored images, fractal feature vectors from test images may be compared to fractal feature vectors of stored images, and the scores from the two comparisons are preferably combined. At the decision level, feature vectors may be classified as accepted or rejected based on user-defined criteria, with a final decision being made on the various decisions. Any of the extracted fractal images may employ a look up table, locally or remotely online, to determine or otherwise classify the extracted features or otherwise stored images.

In accordance with still further embodiments of the invention, to gain better accuracy in evaluation and/or to speed up the process, information selection—using some but not all of the gathered information—may be implemented. Information may be selected using bootstrapping, boosting, machine learning, or other processes.

Multi-Resolution

As noted in above, fractals exhibit self-similarity at multiple scales. Therefore, in accordance with embodiments of the present invention, this self-similarity may be leveraged by implementing any of the previously described algorithms or techniques at multiple resolutions, i.e., capturing a displayed image at multiple resolutions, filtering an image, resizing an image, etc. The information gathered at each resolution level may be compared to detect the level of self-similarity. This information may be used for both identification and verification purposes. It is these multiple levels of resolution capture that may provide additional robustness in the image capture process. Using multi-resolution can speed up the processing. The algorithm may preferably be designed in a cascaded manner, including the ability to first check low resolution. If there is a recognition failure (i.e. a wrong identification is confirmed), processing may stop. If a wrong identification cannot be confirmed, or if more information is necessary, a higher resolution level may then be considered, and so on. Further, such multi-resolution is robust to occlusion. Any information missing at a lower resolution may be available at a higher resolution because of self-similarity.

By employing such multi resolution systems, situations where precise identification and authentication may be required may print such images to very small levels of resolution, even requiring a microscope or the like to read the images. A continuous zooming mechanism may be employed in order to continuously check the fractal pattern at the different levels for consistency. Indeed, different imaging devices may be employed in order to read these images at the different resolutions. Such a reading requirement, and the precision printing required, act to raise the bar for a counterfeit printing process. Merely copying an image may be difficult, and may not result in sufficient printing precision at the various resolutions. Determining a mathematical equation used to generate a fractal image may not be possible simply by viewing the fractal image, and thus, printing an image from the mathematical equation may be always more precise than copying an image. This differential may provide a method for always ensuring that an authentic image is able to be resolved a higher zoom levels than a copied image.

Super Resolution

Fractals analysis or high security analysis may require high resolution images. However, consumer level cameras have limited capability in resolution, which may result in low resolution images. In accordance with an embodiment of the present invention, this problem may be solved by taking advantage of multiple frames using super resolution techniques. Super-resolution is a technique to use multiple frames of the same object to achieve a higher resolution image. It works only if the frames are shifted by fractions of a pixel from each other. The super-resolution algorithm is able to produce a larger image that contains the information in the smaller original frames. Therefore, by imaging multiple frames shifted in position slightly from each other, and combining these frames employing super resolution techniques, a higher resolution image may be obtained for use in accordance with the various embodiments of the invention.

Image Quality

A major issue in computer vision is the environment in which image capture is taking place, and how any environmental factors affect image quality. The quality of an image can be influenced by any number of environmental factors. These environmental factors may include lighting, camera resolution, printer quality, capturing methods, camera angle, distance to camera, etc. Any previously described algorithm or technique or the information gathered from those algorithms or techniques may be adjusted to account for environmental factors. This adjustment may include filtering images before analysis, adjusting the algorithms or techniques, weighting of information, etc. Image quality may be estimated both at a global level and a local level.

Once an overall image quality has been determined, it is possible to perform one or more of the following processes on the captured data:

1) reject very low quality samples and guide the user or select the best samples from consecutive frames. Or alternatively, recognize that some printing devices or imaging devices may produce lower resolution images. In these situations, it may be desirable to include special alignment or other points into the fractal images that may be tested to further determine authenticity. Therefore, in accordance with this particular embodiment of the invention, when an image of low resolution or low quality is acquired, the special printed points may be employed to further detect patterns within the fractal image. Similar to fingerprint analysis, each pattern can be viewed as a special point. Then the problem of identification and authentication becomes in part a point matching problem. These special points may also be used in identifying or authenticating higher resolution images. If a high quality image is "zoomed in", these special points (or smaller patterns) may be detected within each fractal image pattern each pattern. In such a situation similar to the lower resolution problem, in addition to the use of the fractal calculations described above, identification and authentication becomes in part a larger scale point matching problem, which make the system more complex robust and accuracy.

In order to solve such a point matching problem, many approaches may be used in accordance with various embodiments of the invention. These approaches may preferably include one or more of the following: algebraic geometry, including using the information of absolute or relative positions between two points, absolute distance or relative distance, i.e count how many points/patterns between two special points to reduce the computation burden, the absolute or relative directions of points; Hough transform; relaxation; and energy minimization.

2) isolate regions with low quality and analyze regions with good quality. Because of the self similarity and repeatability of fractal images, it is possible to determine portions of an image that provide a higher resolution of information, and process these portions of the image. Thus, in accordance with various embodiments of the invention, it is possible to identify one or more desirable portions of an image related to image quality, and process these portions of an image. Furthermore, selective image portion processing may be employed not only for image resolution, but also certain portions may be provided with different colors, allowing for color filters or other color selection tools to allow for processing of the different portions of the image by different devices, and have these portions isolated and separately processed.

3) adapt matching strategy based on quality

4) Assign different weights to information (features, matching scores and etc.) based on quality.

Fractal Orbits

In accordance with one or more embodiments of the present invention, the complexity of fractals can be utilized in serialization—printing the same fractal but in different manners, allowing the fractal to carry information. This inventive method takes advantage of the fact that fractals defined by an IFS are the attractors of a discrete time stochastic dynamical system defined by the contraction mappings of the IFS. This can be seen in the random iteration algorithm, where an initial point is chosen and a sequence of points is generated. In the language of dynamical systems, these sequences are referred to as trajectories, or orbits. Since the fractal is an attractor of the dynamical system, any orbit that starts on the fractal will stay on the fractal. Hence, individual sequences of points can be marked on the fractal, and used for serialization.

In addition to just marking fractal images, in accordance with an alternative embodiment of the invention, the orbits themselves can carry information. This is most easily seen with IFS's consisting of 2 contraction mappings, but can be applied to IFS's with any number of mappings. With 2 map IFS's, the mappings can be labeled $S_0$ and $S_1$. An orbit may be generated by function composition, i.e.

$$a_k = S^k(a_0) = S_{jk}(S_{jk-1}(\ldots(S_{j1}(a_0))),$$

where $j_k \in \{0, 1\}$, $k \in 1, 2, \ldots$. As this equation demonstrates, an orbit can be denoted by the sequence $j_k j_{k-1} \ldots j_1$. Since the $j_k$'s are either 0 or 1, there is a 1-1 correspondence between binary numbers and orbits of an IFS. As a result, sequences of ASCII characters can be marked on a fractal by the orbit generated by their binary representation.

This further inventive method can be implemented as follows:

1) Select a fractal to encode. The contraction mappings associated with the fractal will be used to generate the orbit.

2) Encode an ASCII string containing user-supplied information. Any processing of the ASCII string will be performed in this step: message encryption, duplication, interleaving, Reed-Solomon error correction, etc.

3) Select a starting point, $a_0$, for the orbit. This can be designated by the user or randomly selected.

4) Generate the orbit corresponding to the binary string generated in step 2. The contraction mapping corresponding to the first digit of the binary string is applied to $a_0$, and the resulting point $a_1 = S_{j1}(a_0)$ is recorded. Next, generate $a_2 = S_{j2}(a_1)$. Repeat this process for each digit of the binary string.

5) Mark the points of the orbit generated in step 4 on the fractal itself. The points can be marked via special characters, color, or other conspicuous markings.

Decoding of the sequence can be implemented in accordance with an alternative embodiment of the invention as follows:

1) Identify the IFS using any of the previously described techniques.

2) Determine the starting point $a_0$ of the orbit. This point will be marked uniquely so it can be easily identified.

3) Determine the remaining points of the orbit that were printed on the fractal. These points may be marked for easy identification.

4) Search for the next point. The contraction maps of the identified IFS are individually applied to $a_0$, and the resulting points are recorded.

5) Compare the results of step 4. Using a user-defined metric, the orbit point closest to a transformed point is selected. The number corresponding to the contraction mapping which produced the closest transformed point is recorded.

6) Loop through the rest of the points. The process described in steps 4 and 5 is repeated for each point of the orbit.

7) Decode the orbits. The sequence of digits corresponding to the sequence of contraction mappings that generated the orbit are converted into ASCII characters.

Other Fractal Like Images

As noted above, the various embodiments of the invention are also applicable to one or more fractal like images that share many characteristics of fractals, but are not necessarily pure fractals in the mathematical sense. These images may differ from fractals in any number of manners.

L-System Fractals

Encoding

Therefore, in accordance with one or more preferred embodiments of the present invention, an inventive encoding process may be implemented in the following manner, although additional encoding processes may also be employed:

1. Convert a string of ASCII characters into their 8-bit binary representation.
2. Apply preprocessing (error correction, message duplication, etc.) to binary representation.
3. Select fractal curve based on application parameters.
4. Print encoded fractal curve.

Step 1 involves ASCII to binary conversion. As an example, here is the binary representation of the string, "L-system":

Decoding

An inventive decoding process for such a generated fractal barcode first determines a type of barcode employed. The determination preferably depends on whether the barcode is assumed to be generated in accordance with a template or is accepted as a free form curve embedded in an image. If the decoder expects a fractal barcode in a template, then the decoder will preferably first extract the fractal barcode from the background, rotate and align it, and then check line segments at expected locations, in effect comparing the portions of the fractal image to the template. If the fractal barcode is accepted as a free form curve, then the decoder will preferably determine a starting location on the curve, determine where the next line segment is located, iterate through each sequential line segment, and extract information based on the characteristics of the line segments. Therefore, in accordance with an embodiment of the invention, the decoding process for a templated fractal curve can be implemented in the following manner:

1. Extract image of fractal barcode.
2. Rotate and scale image.
3. Detect line segments at expected locations and extract binary string.
4. Decode resulting binary string.

Step 1 involves accepting an image of the fractal barcode and determining the corner points of the template. As with most two-dimensional barcoding methods, the fractal barcode may be placed in a square region with the corner points clearly delineated for easy recognition. Of course, and other method for aligning such a fractal barcode may be employed.

Step 2 involves placing the fractal barcode in proper alignment for line segment extraction. Since the fractal barcode is preferably extracted from real-world images, it may be assumed that the barcode region is not perfectly aligned. Based on the relative location of the corner points, the image is preferably properly rotated and aligned into the desired region using a perspective transform, which maps quadrilaterals to quadrilaterals. Other methods of such additional alignment may also be employed.

Step 3 involves iterating through the sequence of line segments at their expected locations. Line segment detection may be performed using the Hough transform or other appropriate method, and binary digits are preferably assigned on whether a line segment has been detected or not at appropriate locations. The output of iterating through all the line segment locations is a binary string.

Step 4 involves the decoding of the binary string extracted from step 3.

In accordance with an alternative embodiment of the invention, the decoding process for a free form fractal curve can be implemented in the following manner:

1. Extract image of fractal barcode.
2. Detect line segments.
3. Check status of line segments and extract binary string.
4. Decode resulting binary string.

Step 1 involves accepting an image of the fractal barcode. No requirements are preferably made on positioning, rotation, alignment, etc. The fractal curve is extracted from the background using standard computer vision techniques (thresholding, Canny edge detection, etc.).

Step 2 involves using the Hough transform (or other appropriate mathematical system or the like) to detect line segments. The line segments are ordered sequentially, so the decoder will preferably iterate through the fractal curve, extracting the location of each line string one after another.

Step 3 involves checking the status of each detected line segment. Here, status is preferably the line color or type, but any type of line segment differentiator may be employed. A binary digit will be assigned to each line segment based on the line type, creating a binary string.

Step 4 involves the decoding of the binary string extracted from step 3. If the fractal curve is closed, then the binary string will be synchronized to recover the proper starting position and the resulting binary string decoded. Thus, after traversing the entire fractal curve, the position of the fractal curve may be shifted until a starting point of the fractal curve is properly aligned, thus allowing for extraction of proper codes. This may include sequentially applying one or more rules to such a determined binary string to further determine if such a sequence follows one or more rules for decoding. Other methods may be employed for extracting the information from the fractal curve. As noted above, while a binary encoding system is described, encoding of the one or more line segments may include any number of differentiable formats. Thus encoding a system employing an English alphabet may be realized using 26 different types of line segments in the image. Any other encoding system may also be embodied.

System Benefits

Benefits of employing the inventive fractal imaging system are myriad. A fractal library database that changes over time may be employed, in the manner noted above, so that changes over time may be documented and later confirmed. Such a fractal database may also be tailored to webcam resolutions commonly used in smartphones, thus providing fractal images with resolution acceptable and able to be imaged by standard webcams in smartphones. Since the ID can be confirmed via a consumer with a mobile device and smart phone, it means that no special scanning hardware is needed. Thus, manufacturers or others may educate consumers to image and verify authenticity of an image, such as through imaging using a webcam on a mobile device or the like.

Confidence levels will allow for different security options. Thus different levels of resolution may be employed based upon a level of desired security. Higher resolution images, requiring higher resolution imaging devices may be employed for higher security applications, while lower resolution imaging and printing may be employed for lower security options. If the inkjet is a low quality printer, then distribution at higher resolutions (as measured by the camera) may suggest that fraud was committed if the ink distribution (or one or more other printing attributes) is different to what is expected.

As further described above, one or more fractal patterns may have a number of different colors built in that act as a calibration code.

Fractal identification labeling is far superior to existing imaging labels. Use of the inventive fractal image will allow for occlusion by the user (due to fingers blocking image or poor environmental conditions) as only a portion of the image may be required to reach desired confidence levels. Such a fractal identification display does not suffer from occlusion problems (e.g. traditionally, one number hidden or obscured may inhibit use of the ID system). Computer vision may therefore be used to learn and to identify replicating blurred images in the fractal and/or expected ratios of patterns, colors or shapes. In the event that occlusion occurs due to the environment and/or finger occlusion, then the system may be able to "piece together" different parts of available fractal images/sections, to create a complete code within a certainty range. Furthermore, fractal identification may operate better than a number, or more traditional barcode, as it is more difficult to replicate.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that this description is intended to cover all of the generic and specific features of the invention herein described and all statements of the scope of the invention which, as a matter of language, might be said to fall there between.

What is claimed:

1. A method for confirming identity, comprising:
   outputting a proximity signal from a reading device indicative of a proximity of a display device to the reading device;
   receiving by the display device the output proximity signal;
   outputting a parameter by the reading device, the reading device configured to read an image displayed on a display of the display device;
   receiving the parameter output by the reading device by the display device;
   generating a fractal image at least in accordance with the received parameter and the received proximity signal by the display device;
   displaying the generated fractal image on the display of the display device;
   imaging the displayed fractal image by the reading device;
   comparing the imaged fractal image to an expected fractal image generated by the reading device at least in accordance with the parameter; and
   confirming that the imaged fractal image and the expected fractal image do not differ by more than a predetermined amount.

2. The method of claim 1, further comprising displaying a confirmation that the imaged fractal image and the expected fractal image do not differ by more than a predetermined amount on the display of the display device.

3. The method of claim 1, further comprising displaying a confirmation that the imaged fractal image and the expected fractal image do not differ by more than a predetermined amount on a display of the reader device.

4. The method of claim 1, wherein the parameter provides a number of fractal layers to be included in the generated fractal.

5. The method of claim 4, wherein the generated fractal image is generated in accordance with a predetermined fractal equation employing the parameter.

6. The method of claim 1, further comprising:
   outputting a second parameter by the reading device;
   receiving the second parameter output by the reading device by the display device;
   generating a second fractal image at least in accordance with the received second parameter;
   displaying the generated second fractal image on the display of the display device;
   imaging the displayed second fractal image by the reading device;
   comparing the imaged second fractal image to an expected second fractal image generated by the reader at least in accordance with the second parameter; and
   confirming that the imaged second fractal image and the expected second fractal image do not differ by more than a predetermined amount.

7. The method of claim 6, wherein the steps of claim 6 are sequentially performed for a predetermined string of parameters and fractal images, generating a changing sequence of fractal image confirmations.

8. The method of claim 1, wherein the closer the display device is to the reader device, the greater number of fractal layers included in the generated fractal image.

9. The method of claim 1, further comprising:
   outputting a proximity signal from the display device indicative of a proximity of the display device to the reading device;
   receiving by the reading device the output proximity signal;
   generating the fractal image by the display device further at least in accordance with the output proximity signal.

10. The method of claim 1, wherein the generated fractal image comprises a plurality of generated fractal images, each of such fractal images being generated in accordance with a different fractal equation, each of such fractal images being generated at least in accordance with the received parameter.

11. The method of claim 1, wherein the display of the display device is a high resolution display, and the reading device is adapted to image a high resolution image presented on the high resolution display of the display device.

12. A method for confirming identity, comprising:
- outputting a proximity signal from a reading device indicative of a proximity of a display device to the reading device;
- receiving by the display device the output proximity signal;
- receiving a parameter by the reading device, the reading device configured to read an image displayed on a display of the display device;
- receiving the parameter by the display device;
- generating a fractal image at least in accordance with the received parameter by the display device and the received proximity signal;
- displaying the generated fractal image on the display of the display device;
- imaging the displayed fractal image by the reading device;
- comparing the imaged fractal image to an expected fractal image generated by the reading device at least in accordance with the parameter; and
- confirming that the imaged fractal image and the expected fractal image do not differ by more than a predetermined amount.

13. The method of claim 12, wherein the parameter is provided at a third location.

14. A system for confirming identity, comprising:
- a reading device further comprising an imaging camera and a computer processor, the reading device reading an image displayed on a display of a display device, the reading device further configured to output a parameter and a proximity signal indicative of a proximity of the display device to the reading device;
- the display device further comprising the display for displaying one or more images thereon, and a computer processor, the display device receiving the output proximity signal, receiving the parameter output by the reading device, generating a fractal image at least in accordance with the received parameter and the received proximity signal by the display device, and displaying the generated fractal image on the display of the display device;
- the reading device further imaging the displayed fractal image, comparing by the computer processor thereof, the imaged fractal image to an expected fractal image generated by the computer processor of the reading device at least in accordance with the parameter; and
- confirming by the computer processor thereof that the imaged fractal image and the expected fractal image do not differ by more than a predetermined amount.

15. The system of claim 14, wherein the fractal image is generated by the computer processor of the display device in accordance with a predetermined fractal equation.

16. The system of claim 14, further comprising a third location parameter generator for generating the parameter.

17. The system of claim 14, wherein the display device further displays on a display associated therewith a confirmation that the imaged fractal image and the expected fractal image do not differ by more than a predetermined amount on the display of the display device.

18. The system of claim 14, wherein the display device displays a confirmation that the imaged fractal image and the expected fractal image do not differ by more than a predetermined amount on a display of the reader device.

19. The system of claim 14, wherein a sequence of parameters are provided, thereby generating a changing sequence of fractal image confirmations.

\* \* \* \* \*